G. P. GOMEZ.
APPARATUS FOR SEPARATING FLUID SUSPENDED MATERIAL.
APPLICATION FILED MAY 12, 1916.
1,220,092.
Patented Mar. 20, 1917.
3 SHEETS—SHEET 1.
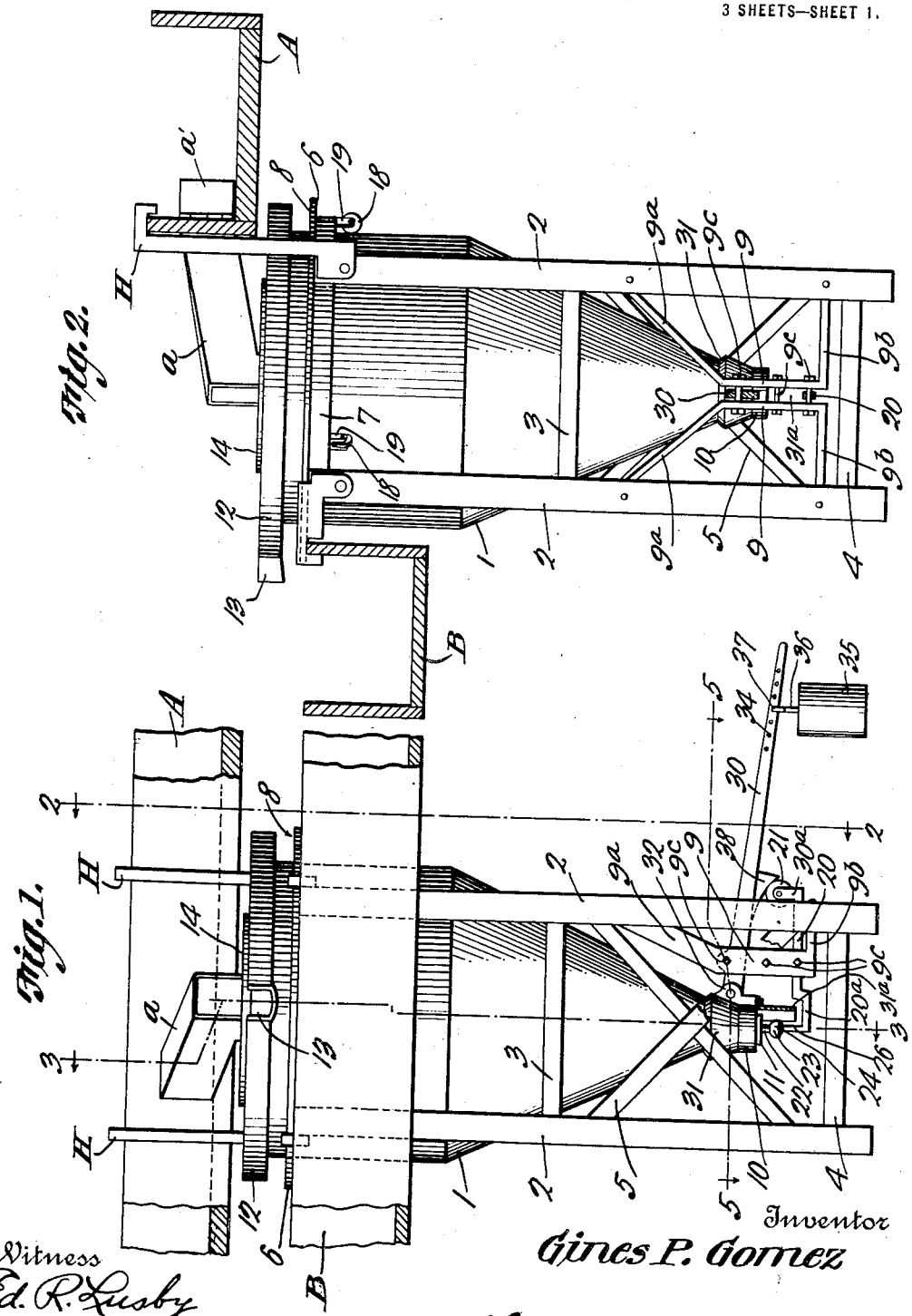
Witness
Ed. R. Lusby
Inventor
Gines P. Gomez
by H. B. Willson & Co.
Attorneys

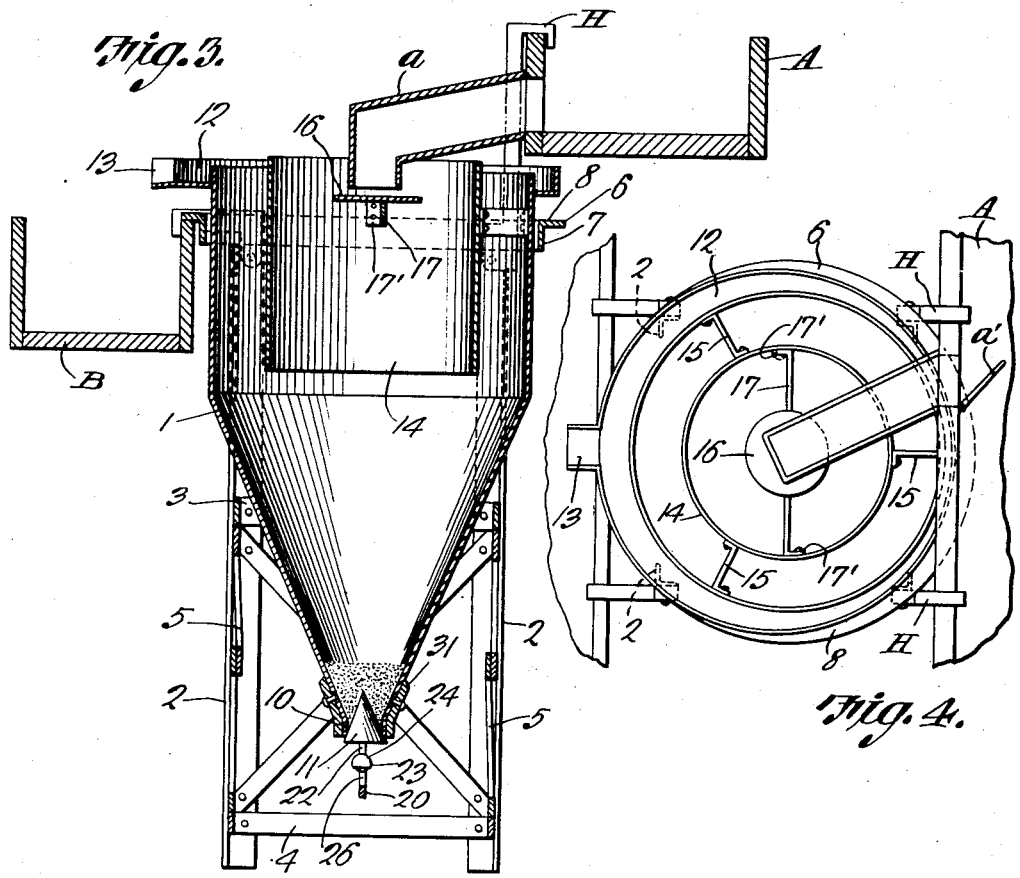
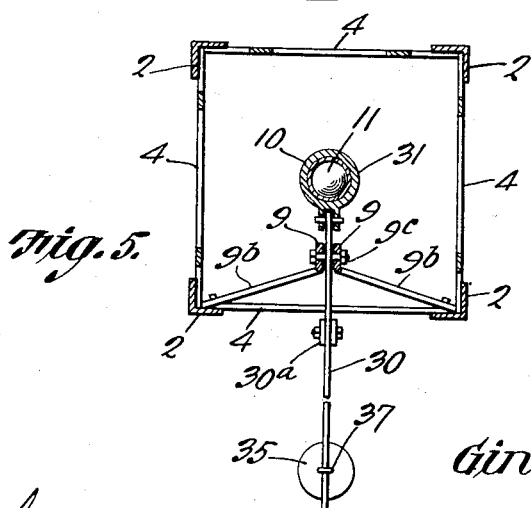

G. P. GOMEZ.
APPARATUS FOR SEPARATING FLUID SUSPENDED MATERIAL.
APPLICATION FILED MAY 12, 1916.
1,220,092.  Patented Mar. 20, 1917.
3 SHEETS—SHEET 3.
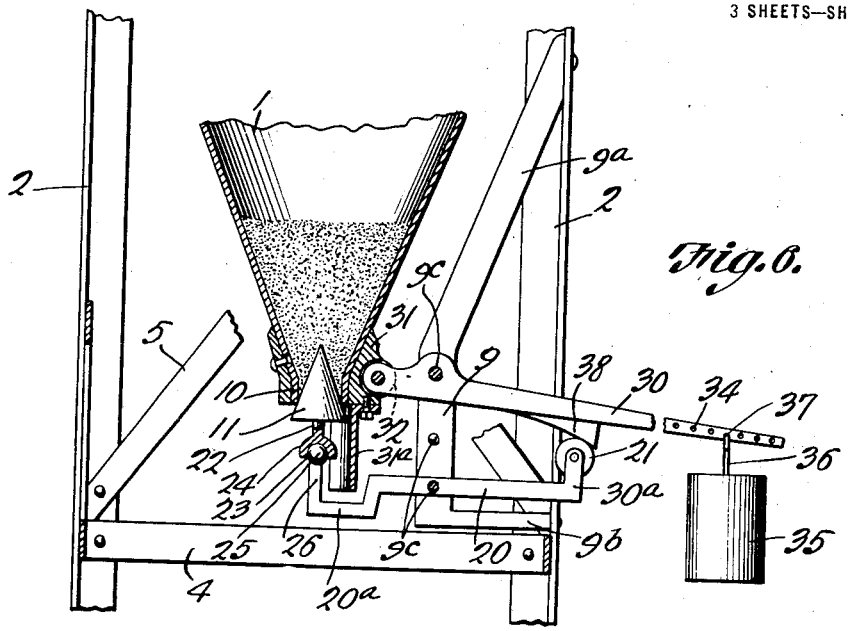
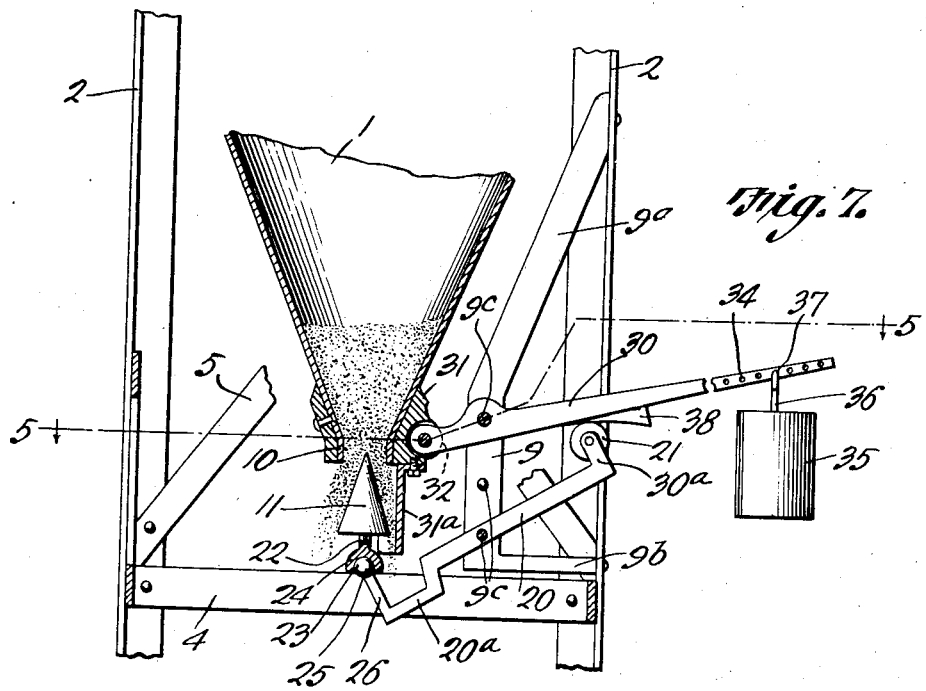

UNITED STATES PATENT OFFICE.

GINÉS PEREZ GOMEZ, OF MIAMI, ARIZONA, ASSIGNOR OF ONE-HALF TO EMILIO SANCHEZ DE HARO, OF MIAMI, ARIZONA.

APPARATUS FOR SEPARATING FLUID-SUSPENDED MATERIAL.

1,220,092.  Specification of Letters Patent.  Patented Mar. 20, 1917.

Application filed May 12, 1916. Serial No. 97,062.

*To all whom it may concern:*

Be it known that I, GINÉS PEREZ GOMEZ, a subject of the King of Spain, residing at Miami, in the county of Gila and State of Arizona, have invented certain new and useful Improvements in Apparatus for Separating Fluid-Suspended Material; and I do declare the following to be a full, clear, and exact description of the invention, such as will enable others skilled in the art to which it appertains to make and use the same.

This invention relates to apparatus for settling and discharging slimes, sand and the like carried in suspension in ditches, flumes and other conveyers, and is especially designed for use in ore concentrators.

The object of this invention is to provide a simply constructed automatically operated apparatus which may be interposed at a convenient point between two flumes, one of which contains ore or sand laden water and the other the clear water freed therefrom, the apparatus operating to separate the ore from the water.

Another object is to so construct the apparatus that the water in its transfer from one flume or canal to the other will be checked sufficiently to allow the matter held in suspension to settle in the apparatus and the clear water to flow out therefrom to the flume designed to receive it, while the sediment will be automatically discharged from time to time into a suitable receptacle.

In the accompanying drawings:

Figure 1 represents a side elevation of this improved apparatus showing the parts in normal position ready to receive the water containing the matter in suspension;

Fig. 2 is a similar view taken in a plane at right angles to Fig. 1 on the line 2—2 of Fig. 1;

Fig. 3 is a vertical section taken on the line 3—3 of Fig. 1;

Fig. 4 is a plan view of the apparatus;

Fig. 5 is a transverse section taken on the line 5—5 of Fig. 1;

Fig. 6 is an enlarged detail vertical section taken through the lower portion of the apparatus showing the parts in position ready to receive the material to be separated; and Fig. 7 is a similar view showing the apparatus in the act of discharging the sediment collected.

In the embodiment illustrated, a flume A is shown through which the water containing the matter in suspension flows, and with the side walls of which the apparatus constituting this invention is engaged being here shown connected therewith by hooks H arranged at one side of the apparatus, while the opposite side of said apparatus is hooked over the edge of one side wall of another flume B positioned in a plane below flume A to receive from the apparatus the purified water from which the suspended matter has been eliminated, and by means of which the apparatus is properly positioned and held relatively to said flumes. An obliquely disposed spout $a$ leads from the flume A and discharges into the separating apparatus. A valve $a^1$ controls the discharge through the spout $a$ and may be operated by any suitable means not shown.

This settling and separating apparatus comprises a receptacle 1 mounted to move vertically in a supporting structure here shown composed of four uprights in the form of angle bars 2 arranged at the corners of the structure and connected by vertically spaced upper and lower cross bars 3 and 4 having diagonally disposed brace bars 5 arranged between them for strengthening the structure.

An annular receptacle supporting member 6 is supported by the upper ends of the uprights 2 and is shown in the form of an angle iron with one flange 7 depending within the frame and the other flange 8 disposed horizontally with its free edge extending outward to form a stop for limiting the downward movement of the receptacle 1, as will be hereinafter more fully described.

At one side of the frame, the diagonal brace bars are omitted and two laterally spaced uprights 9 substituted to provide supports for valve and receptacle supporting levers 20 and 30 to be described. These uprights 9 are disposed within the frame formed by the bars 2 and have outwardly and upwardly inclined arms $9^a$ which are secured at their free ends to two of the corner bars 2 (see Figs. 1, 2, 6 and 7). The lower ends of these uprights 9 are provided with laterally extending arms $9^b$ which are also secured to the bars 2 to which the arms $9^a$ are secured. A plurality of longitudinally spaced bolts 9ᶜ connect and brace the uprights 9 and two of which also form fulcrums for the levers 20 and 30.

The receptacle 1 which forms the settling chamber may be of any suitable shape and composed of any suitable material, being here shown funnel-shaped or substantially cone-shaped and provided at its lower end with a restricted throat 10 forming the sediment discharge or outlet in which is a suitable controlling valve 11 carried by the inner end of the lever 20 which is fulcrumed intermediately of its ends between the uprights 9. The inner end of this lever is offset downwardly as shown at 20ᵃ and provided with an upwardly extending arm 26. The valve 11 carried by the lever 20 is shown cone-shaped to fit within the throat 10 of the receptacle 1 and preferably has threaded engagement with its shank 22, said shank having a ball and socket connection with the lever 20 as shown at 23, the socket 24 being shown formed on the lower end of the shank and the ball 25 on the upstanding arm 26 of lever 20 thereby providing a swiveled connection between the valve and shank which permits the valve lever 20 to be moved laterally relatively to said valve stem 22 without affecting the position of the valve 11. The outer end of said lever 20 projects laterally beyond the supporting frame and has an upstanding bifurcated arm 30ᵃ to receive a cam actuated grooved roller 21 for a purpose to be described.

The lever 30 is also fulcrumed between the uprights 9 in a plane above the lever 20, and is pivotally connected at its inner end to an inverted frusto hollow cone-shaped reinforcing sleeve 31 in which the lower end of the receptacle 1 is seated and to which it is secured. This receptacle seat 31 has laterally extending apertured ears 32 between which the inner end of the lever 30 is disposed and pivotally connected. A curved shield 31ᵃ depends from the sleeve 31 below the lever 30 and is designed to deflect the sediment discharged from the receptacle 1 to one side and prevent it from banking up and interfering with the operation of lever 20. The offset 20ᵃ in lever 20 adapts the valve carrying end of said lever to project upwardly into working position without interference of the lever with the shield.

The outer end of the lever 30 extends laterally some distance beyond the supporting frame and is provided with a plurality of longitudinally spaced apertures 34 to adjustably receive a counterbalancing weight 35. This weight is here shown carried by a shank or stem 36 having a hook 37 at its free end for detachable engagement with one of the apertures 34 of the lever 30.

A cam 38 is carried by the lever 30 in position to be engaged by the roller 21 of the valve lever 20 and the roller engaging face thereof is inclined inwardly and upwardly so that when the receptacle is raised under the action of the weight 35, the cam bearing on the roller 21 will elevate the inner end of the lever 20 and close the valve for a purpose to be described.

An annular channel or conduit 12 is carried by the upper end of the receptacle 1 on the outer face thereof and has a discharge spout 13 arranged at one side and which is designed to be disposed over the clear water receiving flume B. The upright outer wall of this channel extends above the upper edge of the receptacle 1 and the channel widens gradually toward its spout carried side to facilitate the flow of water and prevent overflow thereof.

Arranged within the receptacle 1 and extending about one-third the height thereof, more or less, is a member 14 here shown cylindrical to conform to the cross sectional contour of the upper portion of the receptacle 1. This member 14 is open at both ends and is considerably smaller in diameter than the receptacle 1, being secured to the inner face thereof and spaced therefrom by radially extending arms 15. The upper end of this member 14 extends above the upper end of the receptacle 1 and above the upper edge of the channel 12 and is designed as a distributer and for retarding the velocity of the water flowing across said receptacle.

A distributing disk 16 is supported in the member 14 in a plane below its upper edge with its periphery spaced from the side walls of said member a sufficient distance to permit the ore, sand or other settling material to pass freely between them. This disk is arranged directly below the spout a and is supported by a bar 17 extending transversely across the cylinder 14 and having feet 17′ extending laterally in opposite directions and secured to the opposed walls of said cylinder. The receptacle 1 is guided in its vertical movement and held centered in the frame by a plurality of rollers 18 mounted in depending brackets 19 carried by the vertical flange of the annular member 6.

In the use of this separator or settling apparatus, the parts being in the position shown in Fig. 1, with the water flowing thereinto in its passage from flume A to flume B the weight on the receptacle supporting lever 30 is adjusted so as to overbalance the receptacle 1 and a predetermined amount by weight of material contained therein, (see Fig. 6) so that the longer wide end of the cam on said lever bearing on the roller holds the valve 20 closed and also holds the receptacle against further upward movement. When the weight of the material which settles in the receptacle is sufficient to overcome the weight on lever 30, the receptacle is lowered, and by relieving the pressure exerted by the cam on the roller of valve lever 20, releases said valve and permits it to open under the weight of the material resting thereon, allowing the sediment collected in the receptacle to pass out as shown in Fig. 7 until the weight on the lever 30 again counterbalances the receptacle, thereby raising said receptacle, and by means of the cam, elevating the valve again into closed position, it being desirable that some sediment be left in the receptacle to form a water-tight seal between the valve and its seat. It will thus be seen that the suspended material contained in the water which flows from flume A over and through receptacle 1 to flume B will be deposited in said receptacle and periodically and automatically discharged therefrom, while the water freed from said material will flow over the upper end of the receptacle 1 into the annular conduit arranged therearound and pass out of the spout 13 and enter and flow through flume B. It will also be seen that by the use of independent disconnected levers 20 and 30 when the parts are in the position shown in Fig. 7, the receptacle 1 being at its extreme lower limit and the valve 11 open, and it is desired for any reason to cut off the discharge from said receptacle without altering its position, the free roller carrying end of the valve lever 20 may be grasped and lowered, thereby raising and closing valve 11, while the lever 30 remains raised.

The apparatus above described is very simple in construction, having few parts to get out of order, and when once set, will operate indefinitely without requiring further attention.

I claim as my invention:

1. In a separating apparatus, the combination of a supporting structure, a receptacle open at both ends mounted to reciprocate vertically therein, a lever fulcrumed on said structure and supporting said receptacle, a cam carried by said lever, an overbalancing weight on said lever, a valve operating lever fulcrumed in said structure and disconnected from said first mentioned lever, a valve carried by said operating lever and positioned to normally close the lower end of said receptacle, and means on said valve lever controlled by the cam on said receptacle supporting lever whereby the opening and closing of the valve is automatically controlled by lowering and raising of the receptacle, the valve being independently closable when the receptacle is in lowered position.

2. In a separating apparatus, a vertically movable receptacle open at its upper and lower ends, means for overbalancing said receptacle, and a cam controlled valve for automatically closing and opening the lower end of said receptacle on the raising and lowering of the receptacle, said valve being manually operable independently of said cam for closing said receptacle when the latter is in its lowered position.

3. In a separating apparatus, the combination of a supporting structure, a receptacle open at both ends mounted to reciprocate vertically therein, a lever fulcrumed on said structure and supporting said receptacle, an overbalancing weight adjustable on said lever, a valve operating lever fulcrumed on said structure and disconnected from said first mentioned lever, a valve carried by said operating lever and positioned to normally close the lower end of said receptacle, and coöperating means on said levers controlled by the raising and lowering of said receptacle for automatically closing and opening the valve, one of said levers being movable independently of the other for closing said valve.

4. In a separating apparatus, the combination of a supporting structure, a receptacle open at both ends and mounted to reciprocate vertically therein, a lever fulcrumed intermediately of its ends on said structure and connected at one end with said receptacle for supporting it, an overbalancing weight adjustably mounted on the other end of said lever, a valve lever fulcrumed intermediately of its ends in said structure, a cone-shaped valve swiveled on said lever and positioned to enter and close the lower end of said receptacle, a roller carried by the other end of said lever, and a cam carried by said receptacle supporting lever and engaging said roller whereby the opening and closing of the valve is automatically controlled by the lowering and raising of the receptacle, one of said levers being movable independently of the other for closing said valve.

5. In a separating apparatus, a supporting structure having an annular band at its upper end with an outwardly projecting laterally extending flange, brackets depending from said band and having rollers journaled therein, an inverted substantially conical receptacle mounted to reciprocate vertically in said structure with its side walls engaged and guided by said rollers, a restricted throat at its lower end, an annular trough at its upper end adapted to engage said band for limiting the downward movement of said receptacle, a spout leading from said trough, a distributer mounted in said receptacle and spaced from the side walls thereof, a lever fulcrumed on said structure and engaged at one side of its fulcrum with said receptacle, a weight adjustably mounted on the other side thereof, a valve for closing the throat of said receptacle, and means on said lever for opening and closing the valve on the lowering and raising of the receptacle.

6. In a separating apparatus, the combination of a supporting structure, a receptacle open at both ends mounted to reciprocate vertically therein, a lever fulcrumed on said structure intermediately of its ends, a sleeve carried by said lever and embracing the lower end of said receptacle, a weight adjustable on said lever, and a valve for closing the lower end of said receptacle controlled by the rise and fall of the receptacle.

7. In a separating apparatus, the combination of a supporting structure, a receptacle open at both ends mounted to reciprocate vertically therein, a lever fulcrumed on said structure intermediately of its ends and engaged with the lower end of said receptacle on one side of its fulcrum, a weight adjustably mounted on the other end of said lever, a valve for controlling the opening at the lower end of said receptacle, a lever fulcrumed intermediately of its ends on said structure below said first mentioned lever and disposed substantially parallel therewith, a swiveled connection between one end of said lever and said valve, a shield depending from the lower end of said receptacle between said levers, and a cam and roller carried one by said valve lever and the other by said weighted lever, whereby the valve is automatically closed and opened on the raising and lowering of the receptacle.

In testimony whereof I have hereunto set my hand in presence of two subscribing witnesses.

GINÉS PEREZ GOMEZ.

Witnesses:
C. E. PIENING,
D. O. THURLE.